United States Patent [19]

Tse et al.

[11] Patent Number: 5,261,037

[45] Date of Patent: Nov. 9, 1993

[54] GENERATION AND SIMULATION OF KNOWLEDGE BASES

[75] Inventors: Edison Tse; Min Zhu, both of Los Altos, Calif.

[73] Assignee: Expert Edge Corporation, Palo Alto, Calif.

[21] Appl. No.: 715,753

[22] Filed: Jun. 14, 1991

[51] Int. Cl.⁵ .............................................. G05F 15/00
[52] U.S. Cl. ......................................... 395/76; 395/12; 395/131; 395/700
[58] Field of Search ...................... 395/12, 76, 131, 700

[56] References Cited

U.S. PATENT DOCUMENTS

| | | | |
|---|---|---|---|
| 4,315,315 | 2/1982 | Kossiakoff | 364/300 |
| 4,455,619 | 6/1984 | Masui et al. | 364/900 |
| 4,546,435 | 10/1985 | Herbert et al. | 364/300 |
| 4,656,603 | 4/1987 | Dunn | 364/900 |
| 4,752,889 | 6/1988 | Rappaport et al. | 364/513 |
| 4,839,822 | 6/1989 | Dormond et al. | 364/513 |
| 4,860,204 | 8/1989 | Gendron et al. | 364/300 |
| 4,891,766 | 1/1990 | Derr et al. | 364/513 |
| 4,926,343 | 5/1990 | Tsuruta et al. | 364/513 |

OTHER PUBLICATIONS

Article entitled "Symbologic Adept-A New Idea That Will Change The Way You Think About Expert Systems", Symbologic Corporation 1989, 8 pages.

Primary Examiner—Allen R. MacDonald
Attorney, Agent, or Firm—Skjerven, Morrill, MacPherson, Franklin and Friel

[57] ABSTRACT

Knowledge bases are generated by a computer directly from flowcharts and logic trees. Only a few icons are used in the flowcharts so as to make the flowcharts easier to trace. Different colors are used to indicate the states of statements in the knowledge base. A simulator is provided to simulate knowledge base execution. The simulator displays the corresponding flowcharts and logic trees on the computer screen. The simulator shows which statement is being evaluated and provides various information useful for debugging and personnel training.

22 Claims, 6 Drawing Sheets

Microfiche Appendix Included
(3,089 Microfiche, 32 Pages)

<Exit> = <System working> OR NOT <System working> AND <System repaired>

<System repaired> = <Power & wiring OK> AND <System working 2> OR <Power & wiring OK> AND NOT <System working 2> AND <Call repairman to repair wiring>

<Power & wiring OK> = <Power ON> AND NOT <System working> AND <Wiring OK> OR <Power ON> AND NOT <System working> AND NOT <Wiring OK> AND <Replace wiring>

<Power ON> = <Power ON 1> OR NOT <Power ON 1> AND <Turn on power switch>

GENERATION AND SIMULATION OF KNOWLEDGE BASES

The present specification comprises a microfiche appendix C. The total number of microfiche in the microfiche appendix is 32. The total number of frames in the microfiche appendix is 3089.

A portion of the disclosure of this patent document contains material which is subject to copyright protection The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to operating a computer, and more particularly to generating a knowledge base for an expert system by a computer.

2. Description of Related Art

Figure 1:
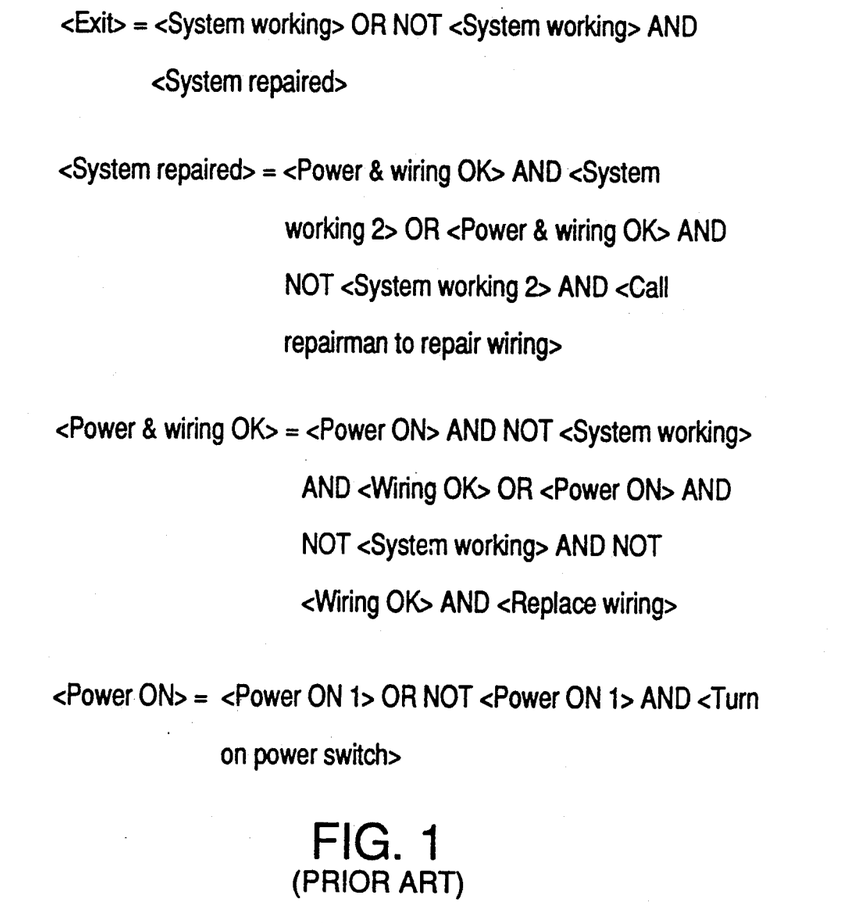
FIG. 1 is a list of rules for input to a prior art knowledge base generation system.

Rule-based expert systems represent an expert's knowledge in the form of rules. Each rule is a logical relationship between statements. FIG. 1 shows the rules of a fairly simple knowledge base that contains the knowledge as to how to troubleshoot a factory system. The knowledge base can be summarized as follows. If the system is not working, check whether the power is on. If the power is off, turn on the power switch. If the system is still not working, check the wiring. If the wiring is defective, replace it. If the system is still not working, call the repairman to fix it.

In order to generate the knowledge base, the user represents the knowledge in the form of rules such as the rules in FIG. 1, and supplies the rules to a computer A computer program then generates the knowledge base.

As is illustrated by FIG. 1, the rules of even a simple knowledge base are confusing, and writing such rules is a difficult and error-prone task.

Figure 7A:
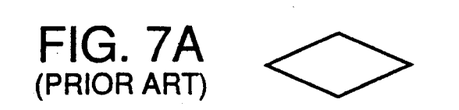
FIGS. 7A-7G show nodes representing statements in a prior art graphical representation of a knowledge base.

Various techniques have been developed to assist the user in writing rules. One technique is to build a graphical representation of the knowledge base before writing the rules. Graphical representations include flowcharts and logic trees. The nodes of a flowchart or a logic tree represent statements of the knowledge base. Different kinds of statements are represented by nodes of different shapes. FIGS. 7A-7G show shows the node shapes in one flowchart technique. Seven different shapes are used as follows:

FIG. 7A is a Question symbol which represents a STATEMENT that waits for input value. The input value can be TRUE, FALSE or UNKNOWN. Examples of commands attached to the STATEMENT are Read_stmt_state, Get_plc_state and Get_timer_state.

Figure 7B:
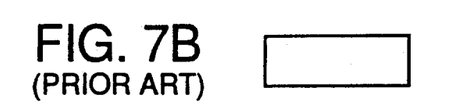

FIG. 7B is an Action symbol which represents a STATEMENT that is similar to the one above except that the triggered STATEMENT is always set to TRUE once the input is read, regardless of its value. A command that is attached to this kind of STATEMENT is Read_confirmation.

Figure 7C:
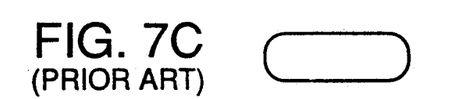

FIG. 7C is a Message symbol which represents a STATEMENT that sends out messages. Send_text is an example of a command attached to this kind of STATEMENT.

Figure 7D:
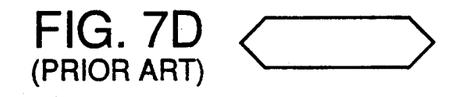

FIG. 7D is a Dummy symbol which represents a STATEMENT that has no commands attached to it.

Figure 7E:
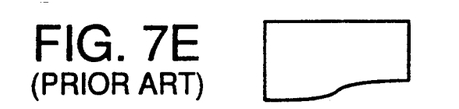

FIG. 7E is a K.B. jump symbol which represents a STATEMENT which, when triggered, will interrupt the current interface loop by executing another named knowledge base. The command attached to the STATEMENT is Run_kb.

Figure 7F:
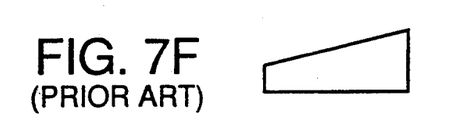

FIG. 7F is a Restart symbol which represents a STATEMENT which when triggered, will restart the whole knowledge base. The command attached is Restart_kb.

Figure 7G:
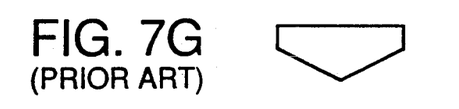

FIG. 7G is an Exit symbol which represents a STATEMENT which when triggered, will terminate the execution of the current knowledge base. The command attached is Quit_kb. The user builds the graphical representation, and then writes the rules while having the graphical representation before him. The graphical representation is easier to construct than the rules, and it guides the user in writing the rules.

While the use of graphical representations simplifies rule writing, the rule writing remains a difficult, error-prone task, especially for large knowledge bases. Further, for a large knowledge base, a graphical representation can be complex and thus difficult to build and use.

Thus it is desirable to provide a system that simplifies generation of knowledge bases. In particular, it is desirable to simplify rule generation. It is desirable to provide visual aids such as flowcharts that are less confusing and consequently easier to use.

It is also desirable to provide a system that simulates knowledge base execution and provides the simulation results so that they are easy to understand. Such a system could facilitate debugging of knowledge bases and training inexperienced personnel

SUMMARY OF THE INVENTION

The present invention provides methods and systems that simplify generation of knowledge bases. A computer generates knowledge bases directly from flowcharts or logic trees. The rules are determined by the program in the computer. The user does not have to write rules, or even be aware of the rules.

The flowcharts are simplified in some embodiments. All the nodes in a flowchart are classified into four different types: start nodes, exit nodes, decision nodes, and procedure nodes. The start node represents the entry point into the knowledge base. The exit nodes represent the exit points. A decision node represents a statement that assesses a knowledge base variable and that has one of three different states: true (T), false (F), or unknown (U). Each procedure node represents an action performed by an expert; that action does not assess any knowledge base variables. The same symbol ("icon") is used for all the nodes of the same type. Thus, in contrast with the prior art, only four symbols ("icons") are used in any flowchart. In some embodiments, even fewer icons are used.

As in prior art, a logic flow from one statement to another in the knowledge base is represented in the flowchart by a line interconnecting the respective nodes. In particular, up to three lines can originate from a decision node, one line corresponding to each of the states true (T), false (F), and unknown (U). In order to help the user trace the logic flow, each decision node in some flowcharts of the invention has portions of different colors for different states. For example, in one embodiment, one corner of the diamond-shaped decision node is green to represent the state T, another corner is red to represent F, and a third corner is yellow to represent U. The logic flow for the case when the statement is true is represented by a line originating from the green corner. The logic flow when the statement is false is represented by a line originating from the red corner. The logic flow when the statement is unknown is represented by a line originating from the yellow corner. The use of multiple colors in the decision nodes makes the flowchart less confusing, and the task of constructing the flowchart easier and less error-prone.

In some embodiments, the user uses a computer program to build flowcharts or logic trees representing the knowledge base. The user defines commands associated with each statement by selecting commands from a command menu. In some embodiments, different command menus are displayed for different types of nodes. For example, a command menu for a decision node is different from a command menu for a procedure node. The use of different command menus helps the user avoid the error of associating a wrong command with a node.

A large knowledge base is typically easier to build if it is represented as a combination of smaller knowledge bases. Each smaller knowledge base can be represented by a flowchart or a logic tree. The linkage between the knowledge bases is provided by commands that cause the expert system to stop executing one smaller knowledge base and start executing another smaller knowledge base. Contrary to the prior art in which the linkage between different smaller knowledge bases was provided only when all the smaller knowledge bases were represented by flowcharts or only when all the smaller knowledge bases were represented by logic trees, this invention allows to link the smaller knowledge bases represented by flowcharts with the smaller knowledge bases represented by logic trees.

In addition, a unique simulation system ("simulator") is provided that simulates a knowledge base execution by an expert system. The simulation system displays on the computer screen the flowchart or the logic tree containing the statements being simulated In some embodiments, the node representing the statement being simulated is marked on the computer screen by a special symbol. Further, when the statements represented by a logic tree are being simulated, the simulator indicates the current state of each statement by the color of the corresponding node. The simulation system is useful in debugging knowledge bases and in training the users to use the expert system. The simulation system is also useful in training those who wish to acquire the knowledge contained in the knowledge base.

DESCRIPTION OF THE PREFERRED EMBODIMENTS

Figure 2:
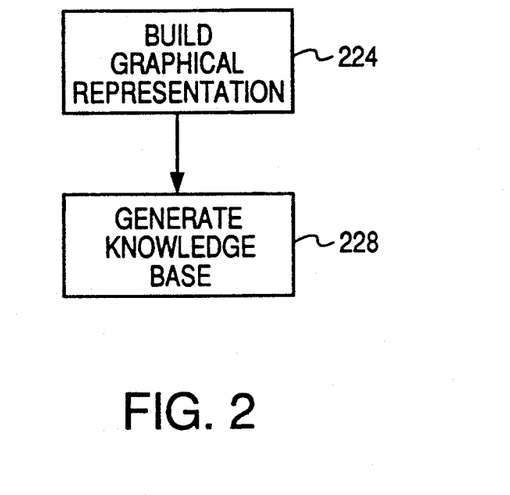
FIG. 2 is a block diagram of a knowledge base generation program according to this invention.

FIG. 2 shows a block diagram of a computer program 220 suitable for generating a knowledge base. At step 224, program 220 allows the user to represent the knowledge base graphically by flowcharts, logic trees, or both. The user builds the graphical representation by means, for example, of a keyboard and a mouse. Program 224 displays the flowcharts and the logic trees on the computer screen as they are being built. Program 224 allows the user to conveniently edit the flowcharts and the logic trees.

At step 228, program 220 generates the knowledge base from the graphical representation built at step 224. In particular, program 228 generates the knowledge base rules. The user does not have to determine the rules or to enter them into the computer Program 228 represents the knowledge base in a format suitable for an input to an inference engine. During the expert system operation, the inference engine reads and executes the knowledge base. An example of an inference engine is described in the U.S. patent application entitled "Expert Control System for Real Time Management of Automated Factory Equipment and Method for Developing Same", Ser. No. 07/339,535, filed Apr. 17, 1989, now U.S. Pat. No. 5,119,318 issued Jun. 2, 1992, whose disclosure is hereby incorporated by reference herein. One embodiment of program 220 is described in Rocky ® 2.0 QuickStart Authoring Guide available from Expert Edge Corporation of Palo Alto, Calif. and also incorporated by reference herein. Appendix C includes the source code of one embodiment of program 220.

Figure 3:
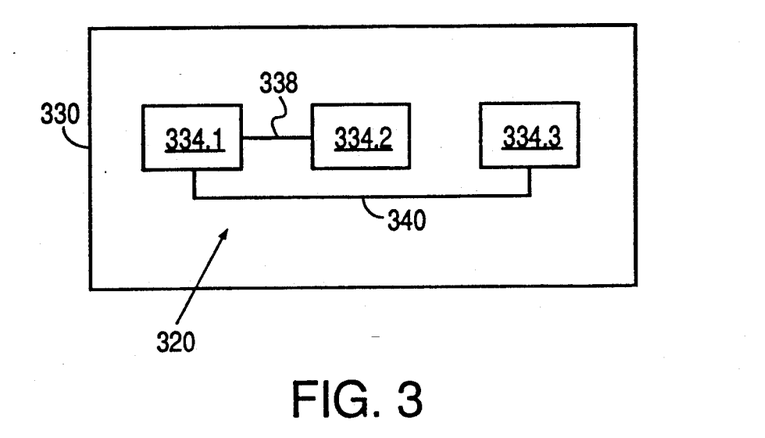
FIG. 3 is a block diagram of a knowledge base in a computer memory.

FIG. 3 shows a block diagram of a typical knowledge base 320 built by program 220. Program 228 stores knowledge base 320 in a computer memory 330 such as the main memory, a disk or some other memory accessible to the computer. Knowledge base 320 typically consists of several smaller knowledge bases 334.1, 334.2, 334.3, and so on. In the simplest case, knowledge base 320 consists of only one knowledge base 334.1.

Knowledge bases 334 can be linked to each other. In the example of FIG. 3, knowledge base 334.1 is linked to knowledge base 334.2 and to knowledge base 334.3 as shown respectively by lines 338 and 340. Linking of knowledge bases is described in the aforementioned U.S. patent application Ser. No. 07/339,535, now U.S. Pat. No. 5,119,318.

At step 224, each knowledge base 334 is represented by a flowchart or a logic tree. As described above, program 228 builds knowledge base 320 from the flowcharts and the logic trees built at step 224.

Figure 4:
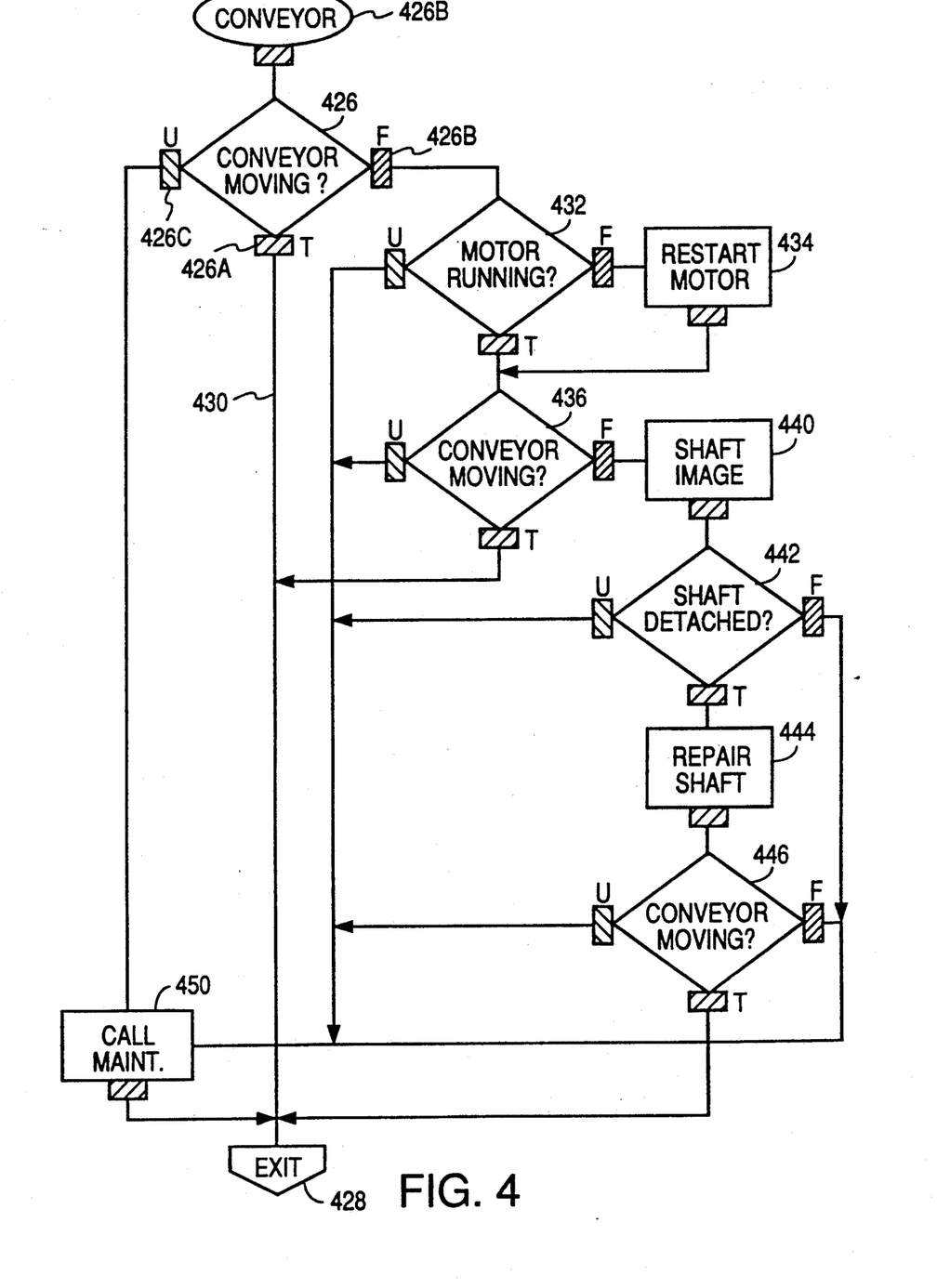
FIG. 4 is a flowchart built using the computer system of this invention.

FIG. 4 shows an example of a flowchart built at step 224. The flowchart represents, in one example, knowledge base 334.1. Knowledge base 334.1 contains the knowledge of an expert in troubleshooting a conveyor on a factory floor. The knowledge can be summarized as follows. If the conveyor is not moving, the expert checks whether the conveyor motor is running. If the motor is not running, the expert restarts the motor repairing it if necessary. If the conveyor is still not moving, the expert checks whether the shaft connected to the motor is detached. If the shaft is detached, the expert repairs the shaft. If the conveyor is still not moving, the expert calls maintenance so as to get help from another, better expert. If the conveyor is moving, the expert terminates the troubleshooting.

Knowledge base 334.1 is represented by the flowchart of FIG. 4 as follows. The Start statement is represented by a start node 424. The logic flow passes from the start statement to the statement represented by a decision node 426. That statement performs a test: "Conveyor moving?" Depending on the answer, the statement has three possible states: true (T), false (F), and unknown (U). To aid the user in tracing the flowchart, decision node 426 has portions of different colors for each state: a green portion 426A for true (T), a red portion 426B for false (F), and a yellow portion 426C for unknown (U). If the statement is true (the conveyor is moving), the logic flow follows a path to the End statement represented by exit node 428. That path is represented by a line 430 that interconnects portion 426A and exit node 428. Exit node 428 represents termination of troubleshooting.

If the statement of decision node 426 is false, control follows to decision node 432 representing the statement: "Motor running?" If the statement is false, control proceeds to procedure node 434, "Restart motor." If the state at decision node 432 is true, control passes to decision node 436. Control from procedure node 434 also passes to decision node 436. Decision node 436 represents the statement: "Conveyor moving?" If the statement is false, the shaft is checked. Namely, at procedure node 440, the shaft image is obtained by the scanner, loaded into the computer and displayed on the operator console. Then control passes to decision node 442, "Shaft detached?" The operator examines the shaft image and provides the answer. If the answer is true, the shaft is repaired at procedure node 444. Then, at decision node 446, again the test is performed "Conveyor moving?" If the answer is false or unknown, control passes to procedure node 450, "Call maintenance." If the answer is true, control passes to exit node 428. At procedure node 450, the maintenance repairs the conveyor, and control passes to exit node 428.

One embodiment uses only four types of nodes for flowcharts: the start node, the decision node, the procedure node, and the exit node. Each decision node has three states: T, F and U. Each start node, procedure node and exit node has only one state. Only four icons are used for the nodes: the start nodes are represented by the oval icon, the decision nodes are represented by the diamond-shaped icon with the portions of different colors for the three states, the procedure nodes are represented by the rectangular icon, and the exit nodes are represented by the pentagon icon In some embodiments, example, the same icon is used for the start nodes and the procedure nodes. The small number of icons makes the flowcharts less confusing and easier to understand. The different colors in the decision nodes also make the flowcharts easier to understand.

In some embodiments, icons for different node types have the same shape, but different colors. In other embodiments, the icons differ both in shape and in color.

At step 224 the user may specify, for any node, a list of one or more commands to be executed by the inference engine when the inference engine evaluates the corresponding statement. For example, in one variation, decision node 426 is associated with a command that causes the computer to read a sensor that senses the conveyor motion. The command returns the value true (T) if the conveyor is moving, false (F) if the conveyor is not moving, and unknown (U) if for some reason it can not be determined whether the conveyor is moving, for example, if a reading error is encountered when the computer reads the sensor. The user specifies the command by specifying the command keyword ("Get_Discrete_Variable" in one embodiment) and the name of a variable corresponding to the sensor. The command causes the computer to read the sensor and set the variable to T, F or U depending on the result of the reading operation. The command then returns the value of the variable.

A variable that can have only the values true (T), false (F), and unknown (U) is termed "discrete" herein. The above-described variable corresponding to the sensor is an example of a discrete variable.

Building flowcharts in the system Rocky 2.0 is described in *QuickStart Authoring Guide*, supra, at pages 85–136. The commands are described at pages A-1 through A-36.

In one embodiment, the user defines variable names using a separate program, "Data Editor" The user also defines, using Data Editor, the correspondence between certain variables and I/O devices such as sensors. One such Data Editor is described in *Quickstart Authoring Guide*, supra, at pages 31–84. Appendix C contains the source code of one such Data Editor.

In some embodiments, certain commands can be associated only with nodes of certain types. For example, in some embodiments, the commands associated with decision nodes assess the value of a discrete variable or perform some other operation that returns the value T, F, or U. The commands associated with procedure nodes do computations, send messages, and perform other operations that do not assess discrete variable values. The commands associated with the start nodes and the exit nodes can only load a display to the operator console or send a message. In some embodiments, only decision nodes can be associated with the commands that assess a value of a discrete variable; the procedure nodes, the start nodes and the exit nodes cannot be associated with such commands.

Figure 5:
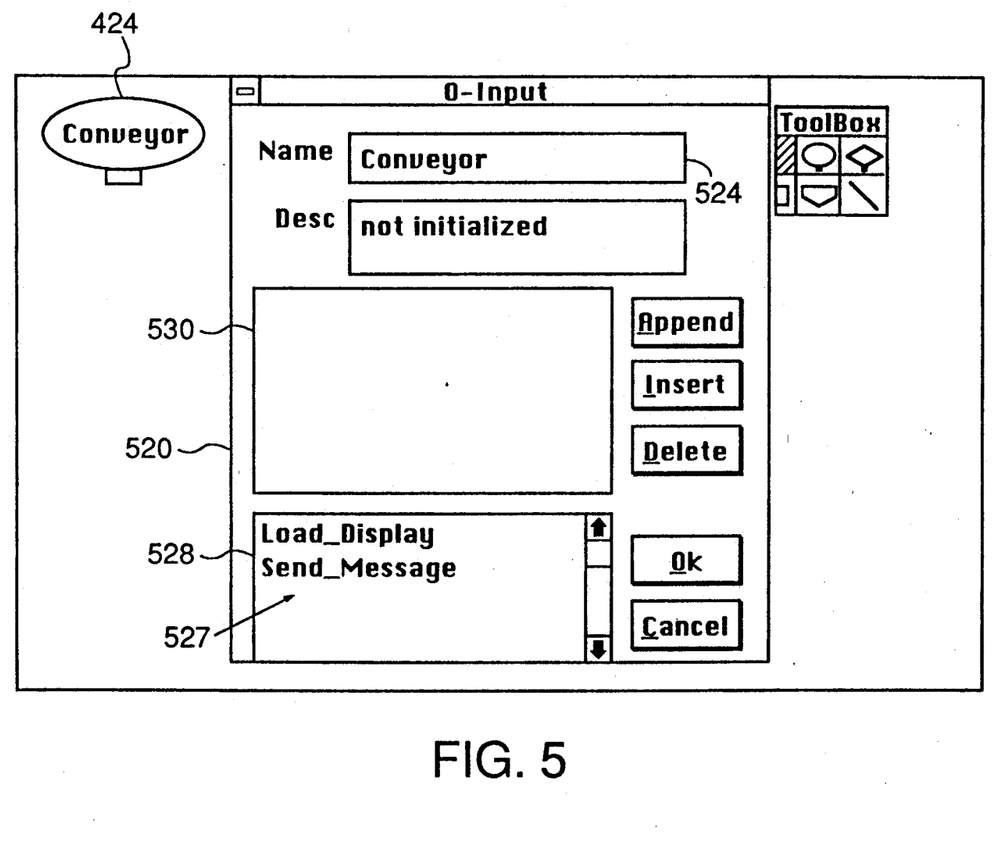
FIG. 5 shows the computer screen at one point during a knowledge base generation by the system of this invention.

FIG. 5 shows the computer screen during the command definition in the system Rocky 2.0. The user has defined start node 424. Using the mouse, the user has opened a node definition screen 520. The user has typed "Conveyor" in the Name entry block 524, and program 224 has displayed the name in start node 424.

Program 224 has also displayed a command menu 527 in a command listing window 528. Using the mouse, the user can select one or more commands from menu 527. The list of the selected commands is associated with start node 424 and is displayed in window 530.

In some embodiments, different node types may correspond to different command menus. The command menus for each node type in the system Rocky 2.0 appear in *QuickStart Authoring Guide*, supra, at page A-33. As shown therein, the command menu for the decision nodes comprises commands that assess values of discrete variables. The command menus for the other types of nodes do not contain such commands. The command menu for the procedure nodes is different from the command menu for the start and exit nodes. Program 224 displays, for each node, the appropriate command menu in command listing window 528. The use of a separate command menu for each node type helps avoid the error of associating a wrong command with a node.

Some commands provide a linkage between different knowledge bases. For example, in one variation of the flowchart of FIG. 4, procedure node 434 ("Restart motor") is associated with the command Run_KB (not shown in FIG. 4). This command forces the inference engine to execute another knowledge base (for example, 334.2) that captures the knowledge of an expert in restarting a motor. Knowledge base 334.2 is represented at step 224 by a flowchart or by a logic tree.

Logic trees provide an alternative graphical representation of a knowledge base. While a flowchart is a convenient way to represent the sequence of steps performed to solve a given problem, a logic tree is a convenient way to represent how the problem is partitioned into smaller problems. Logic trees are described in the aforementioned U.S. patent application Ser. No. 07/339,535, now U.S. Pat. No. 5,119,318.

Figure 6:
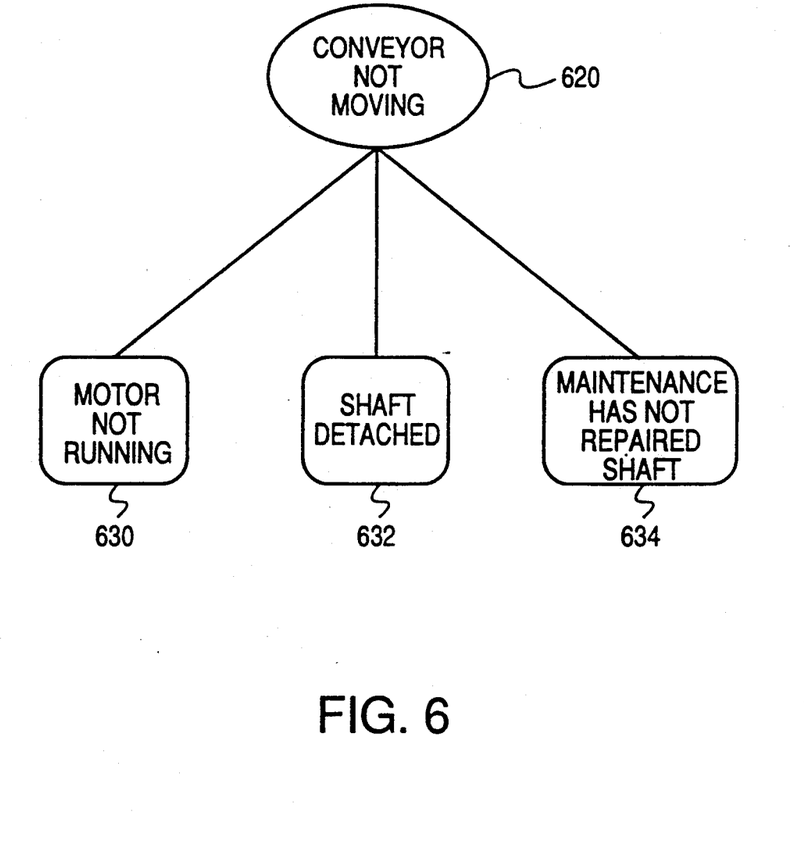
FIG. 6 shows a logic tree as displayed by the system of this invention during knowledge base generation.

FIG. 6 shows a logic tree representing the knowledge base 334.1 of FIG. 4. The problem "Conveyor not moving" (node 620) is partitioned into three problems: (1) "Motor not running" (node 630); (2) "Shaft detached" (node 632); and (3) "Maintenance has not repaired shaft" (node 634). Each node represents a statement in knowledge base 334.1. Each statement has possible values true (T), false (F), unknown (U), and untested. The statement of node 620 is the logical OR of the statements of nodes 630, 632 and 634. Special symbols (not shown) are used in logic trees to describe AND, NOT and other logical relationships among the statements. See generally the aforementioned U.S. patent application Ser. No. 07/339,535, now U.S. Pat. No. 5,119,318.

A statement which is, like the statement of node 620, a logical function of other statements is called a "conclusion" statement. A conclusion statement is represented by a "conclusion" node. Node 620, for example, is a conclusion node. The nor-conclusion statements are represented by "assessment" nodes. Nodes 630, 632 and 634 are assessment nodes. In the system Rocky 2.0, an oval icon is used for each conclusion node and a rectangular icon with round corners is used for each assessment node.

Each node may have a list of commands associated with the node. The inference engine executes the commands when it evaluates the corresponding statement. See, for example, the aforementioned U.S. patent application Ser. No. 07/339,535, now U.S. Pat. No. 5,119,318. In one example, node 632 of FIG. 6 is associated with the following list of commands:
Load_Display
User_Confirm_State
(T, U) User_Confirm_State
Each of these commands has one or more parameters (not shown) The command "Load_Display" obtains the shaft image from a scanner, loads the image into the computer and displays the image on the operator console. The command "User_Confirm_State" displays on the operator console the message: "Shaft detached?" The operator examines the shaft image and provides the answer Yes, No, or Unknown. The state of node 632 is set respectively to true (T), false (F), or unknown (U). If the state of node 632 is T or U, the last command "User_Confirm_State" is executed. The string "(T, U)" before the last command indicates that the last command is executed only if the state of node 632 is T or U. The last command displays the message:
Call repairman at 555-5555 to repair the shaft.
Shaft still detached?

The operator calls the repairman, and when the repairman has attempted to repair the shaft, the operator answers Yes, No, or Unknown to the last question. The state of node 632 is set to T, F, or U depending on the answer.

In the system Rocky 2.0, defining commands for a logic tree at step 224 is similar to defining commands for a flowchart. In particular, different command menus are displayed for a conclusion node and an assessment node. The command menu for the assessment nodes includes commands that assess a discrete variable, while the command menu for the conclusion nodes does not include such commands.

Building logic trees in the system Rocky 2.0 is described in QuickStart Authoring Guide, supra, at pages 137-174. The command menus are shown id., at page A-34.

Commands such as RUN_KB allow to link the knowledge base represented by a logic tree with other knowledge bases represented by logic trees or flowcharts.

The user may specify at step 224 that the execution of any given command in a logic tree is conditional on the state of the respective statement. See, for example, QuickStart Authoring Guide, supra, at page A-35. See also the aforementioned U.S. patent application Ser. No. 07/339,535, now U.S. Pat. No. 5,119,318.

One of knowledge bases 334 is the "root" knowledge base, that is the knowledge base with which the inference engine starts the execution of knowledge base 320. In the system Rocky 2.0, the user specifies the root knowledge base at step 228. Program 228 provide:, in memory 330, information as to which knowledge base is the root. See, QuickStart Authoring Guide, supra, page 203.

A run simulation system is provided for simulating the execution of knowledge base 320 built by program 220. The run simulation system ("simulator") is used to debug the knowledge base and to train inexperienced personnel. The simulator calls the inference engine when needed. During the simulation, the computer does not need to be connected to external equipment, if any, that is to be controlled by the expert system. When the simulator encounters a command to read a value from an external device such as a sensor, the simulator prompts the user to enter the value from the keyboard. See, for example, QuickStart Authoring Guide, supra, pages 205-224.

When the simulator simulates the execution of a knowledge base 334, the simulator displays the corresponding flowchart or logic tree on the computer screen. The node corresponding to the statement whose execution is being simulated is marked on the screen with a special symbol. See, for example, the description of the Rocky icon, id., pages 212-213.

The user can set breakpoints and display various kinds of information during the simulation.

The simulation system allows the user to step through the statements one statement at a time. Each time the user clicks a mouse button, one statement is evaluated and the corresponding commands are executed.

If a knowledge base 334 is built from a logic tree, the simulator indicates the current state of the statements of the knowledge base by the colors of the corresponding nodes. If the state is true, the node boundary is green. If the state is false, the node boundary is red. If the state is unknown, the node boundary is yellow. If the state is untested, the node boundary is black.

The simulator for the system Rock 2.0 is described generally in *QuickStart Authoring Guide,* supra, pages 208–224.

Appendix C contains a source listing for the computer programs implementing the system Rocky 2.0. The programs of Appendix C include program 220 (FIG. 2), the inference engine, the simulator, and the Data Editor. The programs are written in computer language C. The programs can be compiled using compiler Microsoft ® C Optimizing Compiler version 6.00 available from Microsoft Corporation of Redmond, Wash. They can be linked by Microsoft Segmented-Executable Linker version 5.10 available from Microsoft Corporation. The programs can be compiled and linked on the computer IBM ® PC available from the IBM Corporation of San Jose, Calif. A suitable operating system is MS-DOS ® version 3.3 running with MS Windows (Trademark) 3.0, both available from Microsoft Corporation. The programs can be executed on the computer IBM PC-286 available from the IBM Corporation of San Jose, Calif. The hardware requirements for the execution are listed in *QuickStart Authoring Guide,* supra, pages 13–14. The software requirements including the operating system are listed therein at page 14.

While the invention has been described with respect to the embodiments set forth above, other embodiments and variations not described herein are within the scope of the invention. For example, the invention should not be limited by the shapes or colors of the nodes. Other embodiments and variation not describe, herein are to be considered within the scope of the invention, as defined by the following claims.

What is claimed is:

1. A method of generating a knowledge base, comprising the steps of
   building, in a computer, a flowchart of said knowledge base; and
   generating rules of said knowledge base from said flowchart by said computer.

2. The method of claim 1 wherein said generating step comprises the step of representing said rules in an input format of a computer inference system.

3. The method of claim 1 wherein said flowchart building step comprises the step of displaying said flowchart on a display of said computer.

4. The method of claim 3, wherein said building step further comprises the steps of:
   selecting one or more nodes in said flowchart; and
   associating, in said computer, each selected node with a list of one or more commands to be executed by an inference engine during an evaluation of a statement represented by said node, at least one of said lists having a plurality of commands.

5. The method of claim 4 wherein said associating step comprises, for each selected node, the steps of:
   displaying a command menu on said display by said computer;
   selecting one or more commands from said menu; and
   putting the selected commands into the respective command list by said computer.

6. The method of claim 5,
   wherein said node selecting step comprises the steps of:
   selecting one or more decision nodes; and
   selecting one or more procedure nodes;
   wherein, for each selected node, the respective step of displaying a command menu comprises the steps of:
   displaying a first menu if said selected node is a decision node; and
   displaying a second menu if said selected node is a procedure node; and
   wherein one of said first and second menus comprises at least one command absent from the other one of said first and second menus. base.

7. The method of claim 4 wherein one of said commands comprises a command to execute a first knowledge 8. The method of claim 7 wherein said first knowledge base is a logic tree knowledge base.

9. The method of claim 3,
   wherein said knowledge base comprises a plurality of statements; and
   wherein said building step further comprises the steps of:
   representing each statement that has only one state and that is not a Start statement and not an End statement by a node of a first icon in said flowchart; and
   representing each statement having more than one state by a second icon different from said first icon in said flowchart.

10. The method of claim 9 wherein said first and second icons have different shapes.

11. The method of claim 9 further comprising the
    selecting one or more of said nodes that have only one state; and
    for each selected node, defining one or more commands to be executed when said node is evaluated, wherein said defining step comprises the steps of:
    – displaying a command menu on said display by said computer,
    receiving by said computer an input signal identifying one or more commands in said menu; and
    representing, by said computer, the identified commands in a data storage as the commands to be executed when said node is evaluated.

12. A computer system for generating a knowledge base, said system comprising:
    means for building in a computer a graphical representation of said knowledge base; and
    means for generating rules of said knowledge base from said graphical representation by said computer.

13. The computer system of claim 12 further comprising a computer display,
    wherein said building means comprises means for displaying said graphical representation on said display as said graphical representation is being built.

14. A method of generating a first knowledge base comprising a plurality of second knowledge bases, said method comprising the steps of:
    creating a graphical representation of each second knowledge base on a display of a computer, each graphical representation being a flowchart or a logic tree; and
    generating said first knowledge base from said graphic representations by said computer.

15. A method of generating a knowledge base, said method comprising the steps of:
    building, in a computer, a logic tree representing said knowledge base; and generating rules of said knowledge base from said logic tree by said computer.

16. The method of claim 15 wherein said generating step comprises the step of representing said knowledge base in a format suitable for an input to a computer inference system, said system being for evaluating knowledge base goals.

17. The method of claim 15 wherein said building step comprises the step of displaying said logic tree on a display of said computer.

18. The method of claim 15 wherein said building step comprises the steps of:
selecting one or more nodes in said logic tree; and
associating, in said computer, each selected node with a list of one or more commands that are to be executed by an inference engine when said inference engine processes said node.

19. The method of claim 18 wherein at least one of said lists comprises a command to execute a first knowledge base.

20. The method of claim 19 wherein said first knowledge base is a flowchart knowledge base.

21. The method of claim 18,
wherein said logic tree comprises one or more first nodes, each first node having a child node, and one or more second nodes, each second node having no child node;
wherein each selected node is selected from said first and second nodes;
wherein the command list associated with one of said selected second nodes comprises a command to assess a discrete variable; and
wherein each command list associated with one of said selected first nodes comprises no command to assess a discrete variable.

22. The method of claim 18 wherein said associating step comprises, for each selected node, the steps of:
sending to said computer a first signal identifying said node;
displaying by said computer, in response to said first signal, a command menu;
sending to said computer a second signal identifying a list of commands from said command menu; and
representing by said computer, in response to said second signal, said list of commands in a data storage as the list of commands to be executed when said inference engine processes said node.

* * * * *

UNITED STATES PATENT AND TRADEMARK OFFICE
CERTIFICATE OF CORRECTION

PATENT NO.    : 5,261,037
DATED         : November 9, 1993
INVENTOR(S)   : Tse et al.

It is certified that error appears in the above-identified patent and that said Letters Patent is hereby corrected as shown below:

Col. 1, line 50, delete "shows".

Col. 10, line 10, delete "base.".

Col. 10, line 13, after "edge" insert --base.--.

Signed and Sealed this

Sixth Day of September, 1994

Attest:

BRUCE LEHMAN

Attesting Officer    Commissioner of Patents and Trademarks